US012752856B2

(12) United States Patent
Kamemoto et al.

(10) Patent No.: US 12,752,856 B2
(45) Date of Patent: Oct. 6, 2026

(54) REAR VEHICLE-BODY STRUCTURE

(71) Applicant: Mazda Motor Corporation, Hiroshima (JP)

(72) Inventors: Eiji Kamemoto, Aki-gun (JP); Kouji Matsushita, Aki-gun (JP); Kazutaka Ishikura, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 728 days.

(21) Appl. No.: 18/109,883

(22) Filed: Feb. 15, 2023

(65) Prior Publication Data

US 2023/0264752 A1 Aug. 24, 2023

(30) Foreign Application Priority Data

Feb. 24, 2022 (JP) ................................ 2022-026781

(51) Int. Cl.
*B62D 25/08* (2006.01)
*B60K 1/04* (2019.01)
(Continued)

(52) U.S. Cl.
CPC ............ *B62D 25/08* (2013.01); *B62D 21/02* (2013.01); *B62D 21/15* (2013.01); *B62D 25/025* (2013.01);
(Continued)

(58) Field of Classification Search
CPC ........ B62D 21/02; B62D 25/08; B62D 25/20; B62D 25/2027; B62D 25/2036; B60K 1/04; B60K 2001/0438
See application file for complete search history.

(56) References Cited

U.S. PATENT DOCUMENTS 11,820,432 B2 * 11/2023 Kamei ................ B62D 21/157
11,970,214 B2 * 4/2024 Kim ....................... B60L 50/66
(Continued)

FOREIGN PATENT DOCUMENTS

| | | | |
|---|---|---|---|
| DE | 102021005515 | A1 | 12/2021 |
| EP | 3608208 | A1 | 2/2020 |
| JP | 2019-137351 | A | 8/2019 |

OTHER PUBLICATIONS

Extended European search report issued on Jun. 15, 2023, in corresponding European patent Application No. 23157196.9, 7 pages.

*Primary Examiner* — Gregory A Blankenship
(74) *Attorney, Agent, or Firm* — XSENSUS LLP

(57) ABSTRACT

A rear vehicle-body structure absorbs an impact from vehicle rear even when an installed amount of the batteries is increased by including a rear side frame which extends in a vehicle front-rear direction, a rear-side cross member which is arranged such that a front portion of the rear side frame abuts the rear-side cross member from vehicle rear, the rear-side cross member extending in a vehicle width direction, a pair of left and right side sills which are spaced apart, by predetermined distances, from the front portion of the rear side frame to vehicle-width-direction outer sides and extend in the vehicle front-rear direction, and a rear-side battery frame which extends in the vehicle width direction in the vehicle rear of a battery and in vehicle front of the rear side frame. The rear-side battery frame is mounted on the left and right side sills and on the rear-side cross member.

13 Claims, 10 Drawing Sheets

(51) Int. Cl.

| | |
|---|---|
| ***B62D 21/02*** | (2006.01) |
| ***B62D 21/15*** | (2006.01) |
| ***B62D 25/02*** | (2006.01) |
| ***B62D 25/20*** | (2006.01) |

(52) U.S. Cl.
CPC ...... *B62D 25/20* (2013.01); *B60K 2001/0438* (2013.01)

(56) References Cited

U.S. PATENT DOCUMENTS

| | | | | |
|---|---|---|---|---|
| 12,065,030 | B2 * | 8/2024 | Kamemoto | B60K 1/04 |
| 12,134,312 | B2 * | 11/2024 | Kamei | B60K 1/04 |
| 12,280,833 | B2 * | 4/2025 | Hirakawa | B62D 25/2027 |
| 12,286,004 | B2 * | 4/2025 | Hiramatsu | B62D 21/02 |
| 2018/0272852 | A1 * | 9/2018 | Ajisaka | B62D 21/07 |
| 2019/0275875 | A1 * | 9/2019 | Fukui | B60K 1/04 |
| 2020/0086929 | A1 * | 3/2020 | Watanabe | B60K 1/04 |
| 2020/0376948 | A1 * | 12/2020 | Yamada | B60L 50/66 |
| 2020/0385056 | A1 * | 12/2020 | Kubota | B62D 25/2027 |
| 2021/0061080 | A1 * | 3/2021 | Otoguro | B62D 21/15 |
| 2021/0107571 | A1 * | 4/2021 | Fujisawa | B62D 25/2036 |
| 2021/0147001 | A1 * | 5/2021 | Lian | B60K 1/04 |
| 2021/0339617 | A1 * | 11/2021 | Ohkuma | H01M 50/242 |
| 2022/0105991 | A1 * | 4/2022 | Kim | B62D 25/20 |
| 2022/0227215 | A1 * | 7/2022 | Ishizaki | B62D 21/157 |
| 2022/0250459 | A1 * | 8/2022 | Danneberg | B60K 1/04 |
| 2022/0258586 | A1 * | 8/2022 | Amsz | B62D 25/2072 |
| 2022/0297523 | A1 * | 9/2022 | Danneberg | B62D 25/20 |
| 2022/0348068 | A1 * | 11/2022 | Lee | H01M 10/625 |
| 2023/0036105 | A1 * | 2/2023 | Langworthy | H01M 50/207 |
| 2023/0202580 | A1 * | 6/2023 | Jeong | B60K 1/04<br>180/65.1 |
| 2023/0249534 | A1 * | 8/2023 | Kim | B62D 27/065<br>180/68.5 |
| 2023/0253674 | A1 * | 8/2023 | Kim | A62C 3/07<br>429/82 |
| 2023/0264563 | A1 * | 8/2023 | Kamemoto | B62D 21/157<br>180/68.5 |
| 2023/0264752 | A1 * | 8/2023 | Kamemoto | B60K 1/04<br>296/203.01 |
| 2023/0278412 | A1 * | 9/2023 | Han | B62D 25/20 |
| 2023/0291050 | A1 * | 9/2023 | Tang | B60K 1/04 |
| 2024/0001992 | A1 * | 1/2024 | Lee | H01M 50/209 |
| 2024/0034141 | A1 * | 2/2024 | Yoshida | B62D 25/087 |
| 2024/0123811 | A1 * | 4/2024 | Yi | H01M 10/6556 |
| 2024/0375501 | A1 * | 11/2024 | Jeong | B62D 25/145 |
| 2025/0206123 | A1 * | 6/2025 | Shirai | B60R 22/22 |

* cited by examiner

REAR VEHICLE-BODY STRUCTURE

CROSS-REFERENCE TO RELATED APPLICATION

This patent application claims priority to Japanese Patent Application No. 2022-026781, filed on Feb. 24, 2022, the entire disclosure of which is hereby incorporated by reference herein.

FIELD

The present disclosure relates to a rear vehicle-body structure for an electric vehicle, for example.

DESCRIPTION OF RELATED ART

For example, Patent Literature 1 discloses a vehicle in which batteries are installed below a floor panel. In Patent Literature 1, side sills are respectively provided on both sides of a vehicle cabin, and rear side frames are respectively provided in vehicle rear of the left and right side sills. The rear side frame has a front-rear extension portion which extends in a vehicle front-rear direction, a bending portion which obliquely bends to a vehicle-width-direction outer side in a front end portion of the front-rear extension portion, and an inclined portion which extends forward from the bending portion, and a front end portion of the inclined portion is bonded to the side sill. In the bonding portion between the rear side frame and the side sill, a load transmission member is provided, and a fragile portion is provided which is formed with a member more fragile than other sections.

In Patent Literature 1, when an impact load is exerted from the vehicle rear, the fragile portions of the rear side frames start deforming earlier than the other sections, and forward deformation of a rear cross member and so forth in rear of the batteries is thereby allowed.

CITATION LIST

Patent Literature

[Patent Literature 1] Japanese Unexamined Patent Application Publication No. 2019-137351

SUMMARY

Problems to be Solved

Incidentally, in a case of an electric vehicle, because an installed amount of batteries for supplying electric power to a traveling motor directly influences a cruisable distance, it is demanded that the installed amount of the batteries be increased as much as possible. When an attempt is made to increase the installed amount of the batteries in the electric vehicle in which the batteries are installed below a floor panel as in Patent Literature 1, it is necessary to secure a wide installation space in a vehicle front-rear direction.

However, in Patent Literature 1, a rear side frame is bonded to a side sill by forming a bending portion and an inclined portion in the rear side frame, a load transmission member and a fragile portion are provided to a bonding portion between the rear side frame and the side sill, and those are protruded to a vehicle-width-direction inner side. Thus, the installation space of the batteries cannot be elongated to vehicle rear, and as a result, it has been difficult to increase the installed amount of the batteries.

Further, in Patent Literature 1, hypothetically, in a case where an attempt is made to elongate the installation space of the batteries to the vehicle rear, the load transmission member and the fragile portion cannot be provided. Thus, a measure against a case where an impact load is exerted from the vehicle rear becomes a problem.

The present disclosure has been made in consideration of such problems, and one of the objects thereof is to enable an impact load from vehicle rear to be absorbed even in a case where an installation space of batteries is elongated to a vehicle rear side and an installed amount of the batteries is increased.

Solutions to the Problems

A first aspect of the present disclosure can be based on a rear vehicle-body structure for an electric vehicle which includes a traveling motor and in which a battery supplying electric power to the traveling motor is disposed below a floor panel. The rear vehicle-body structure includes: a rear side frame which extends in a vehicle front-rear direction in a vehicle rear portion; a rear-side cross member which is arranged such that a front portion of the rear side frame abuts the rear-side cross member from vehicle rear, the rear-side cross member extending in a vehicle width direction; a pair of left and right side sills which are spaced apart, by predetermined distances, from the front portion of the rear side frame to vehicle-width-direction outer sides and extend in the vehicle front-rear direction; and a rear-side battery frame which extends in the vehicle width direction in the vehicle rear of the battery and in vehicle front of the rear side frame and protects the battery. A battery casing which includes the rear-side battery frame is mounted on the left and right side sills and on the rear-side cross member.

With this configuration, an impact load exerted from the vehicle rear is input to the rear side frame, and the impact load input to the rear side frame is transmitted to the left and right side sills and the rear-side battery frame via the rear-side cross member. Because the rear-side battery frame is a member for protecting the battery and thus has high strength, the input impact load is absorbed by the rear-side battery frame. Further, because the left and right side sills are members which extend in the vehicle front-rear direction and have high strength, an input impact load is also dispersed to and absorbed by the left and right side sills. Consequently, it becomes possible to cause the input impact load to be transmitted to and absorbed by the rear-side battery frame and the left and right side sills without providing a load transmission member or a fragile portion between the rear side frame and rear portions of the side sills as in Patent Literature 1. Accordingly, it becomes possible to increase an installed amount of the battery by elongating an installation space of the battery to a vehicle rear side.

In a second aspect of the present disclosure, the battery can be installed in an area from an imaginary straight line to the vehicle-width-direction outer side of the imaginary straight line, the imaginary straight line extending from the front portion of the rear side frame toward the vehicle front. With this configuration, because the installation space of the battery becomes wide in the vehicle width direction between the left and right side sills, it becomes possible to further increase the installed amount of the battery.

In a third aspect of the present disclosure, in a vehicle side view, the battery may be installed to an area in the vehicle rear of rear portions of the side sills. With this configuration, because the installation space of the battery can be elongated to the rear of the rear portions of the side sills, it becomes possible to further increase the installed amount of the battery.

The rear-side cross member according to a fourth aspect of the present disclosure may be formed to be arranged on an upper surface of the rear-side battery frame and to extend along the upper surface of the rear-side battery frame. The rear-side cross member and the rear-side battery frame can be fastened together in an up-down direction. With this configuration, the rear-side cross member and the rear-side battery frame can firmly be fixed together.

The rear-side cross member according to a fifth aspect of the present disclosure can be joined to a lower surface of the floor panel. With this configuration, rigidity of the floor panel can be enhanced by the rear-side cross member, and an impact load exerted on the rear-side cross member can also be dispersed to and absorbed by the floor panel.

The rear-side cross member according to a sixth aspect of the present disclosure may have a front plate portion which extends in an up-down direction and the vehicle width direction and a rear plate portion which is spaced apart from the front plate portion in a vehicle longitudinal direction and extends in the up-down direction and the vehicle width direction. A dimension of the rear plate portion in the up-down direction can be set longer than a dimension of the front plate portion in the up-down direction, and the front portion of the rear side frame can abut the rear plate portion from the vehicle rear and be joined to the rear plate portion.

With this configuration, the rear-side cross member has the front plate portion and the rear plate portion and thereby becomes a highly strong member. Furthermore, the front portion of the rear side frame is joined to the rear plate portion having a relatively long dimension in the up-down direction, a wide joining area can thereby be secured, and joining strength can be enhanced.

Advantages

As described above, a rear-side battery frame which protects a battery is mounted on left and right side sills and on a rear-side cross member, and an impact load exerted on a rear side frame can thereby be dispersed to each member. Accordingly, an impact load from vehicle rear can be absorbed even in a case where an installation space of batteries is elongated to a vehicle rear side and an installed amount of the batteries is increased.

DETAILED DESCRIPTION

The present disclosure will hereinafter be described in detail based on drawings. Note that the description in the following is exemplary and is not at all intended to restrict the present disclosure, applications thereof, or uses thereof.

Figure 1:
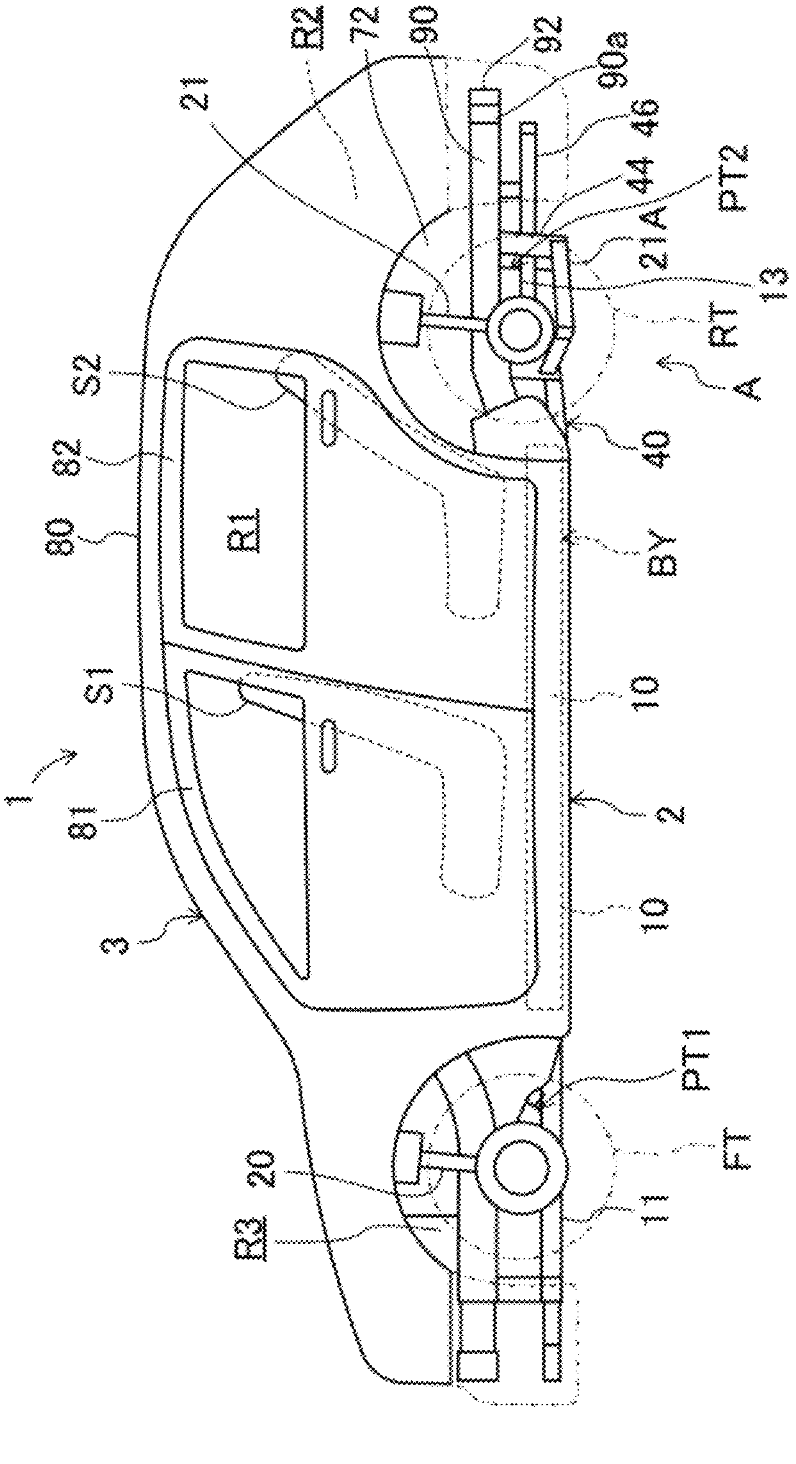
FIG. 1 is a side view of an electric vehicle according to an embodiment, in which a part of the electric vehicle is omitted.
Figure 2:
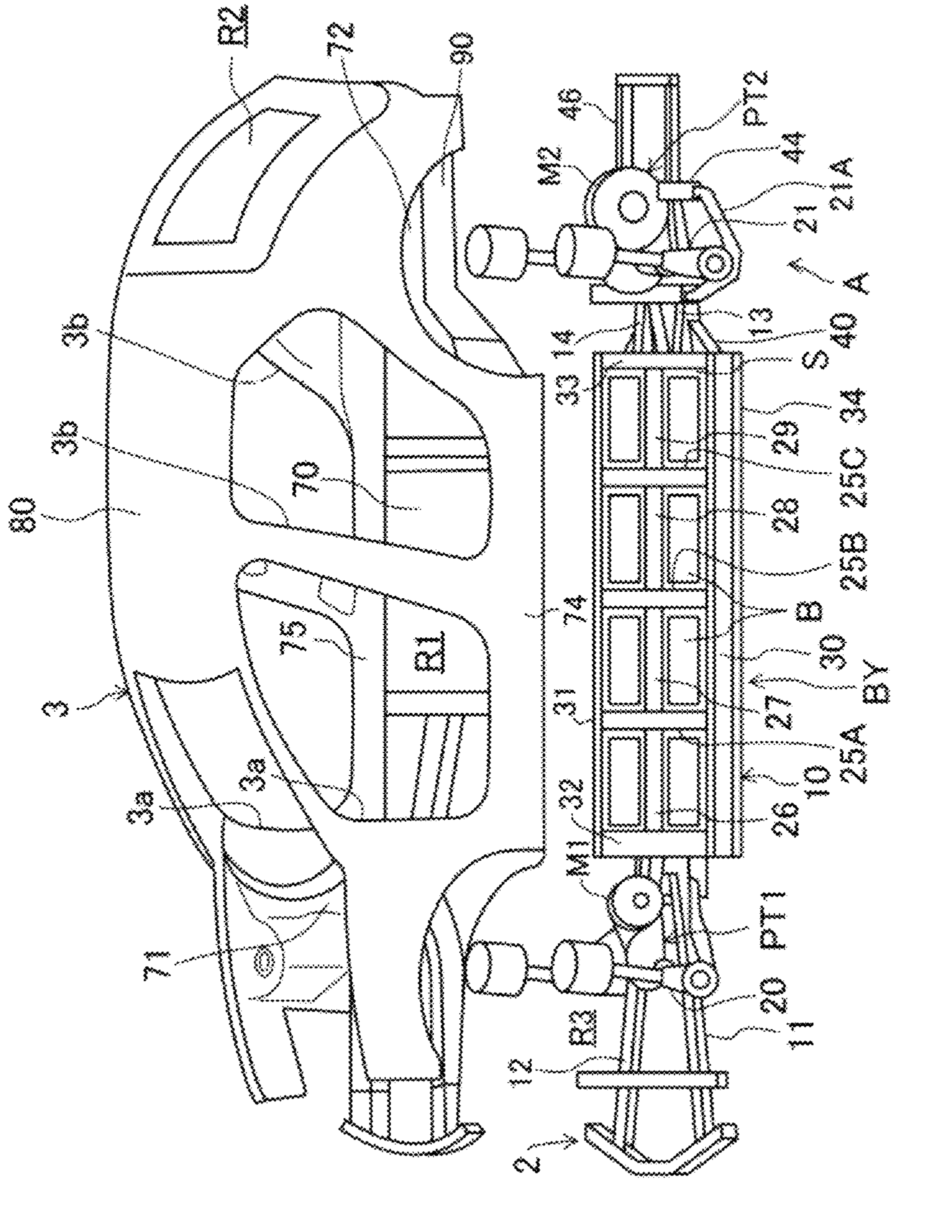
FIG. 2 is a side view illustrating a state where the electric vehicle is divided into a lower structure and an upper structure.

FIG. 1 is a left side view of an electric vehicle (electric automobile) 1 including a rear vehicle-body structure A according to the present disclosure. As illustrated in FIG. 2, the electric vehicle 1 includes a lower structure 2 and an upper structure 3. In FIG. 1, a front bumper, a rear bumper, front and rear wheels, and so forth are omitted and are illustrated by imaginary lines, and each portion is schematically illustrated. In FIG. 2, in addition to the components omitted in FIG. 1, doors, a bonnet hood, a front fender, window glass, front and rear lighting devices, interior materials, and so forth are omitted, and each portion is schematically illustrated.

Note that in the description of the embodiment, a vehicle front side will simply be referred to as "front", a vehicle rear side will simply be referred to as "rear", a vehicle right side will simply be referred to as "right", and a vehicle left side will simply be referred to as "left". A right-left direction of the vehicle is a vehicle width direction.

As illustrated in FIG. 1, the electric vehicle 1 is a passenger automobile. The electric vehicle 1 may be any of a sedan type, a hatch-back type, a minivan type, and so forth, and its shape is not particularly limited. As illustrated in FIG. 2, in the electric vehicle 1, a vehicle cabin R1 is formed which serves as a staying space (vehicle cabin inside space) for an occupant. As illustrated in FIG. 1, a front seat (seat) S1 is provided on a front side in the vehicle cabin R1, and a rear seat S2 is provided in rear of the front seat S1 in the vehicle cabin R1. In the rear of the rear seat S2, a trunk R2 is provided in accordance with necessity. The vehicle cabin R1 and the trunk R2 are provided to the upper structure 3. Note that in the vehicle cabin R1, only the front seat S1 may be provided, or a third row seat may be provided in the rear of the rear seat S2.

Figure 3:
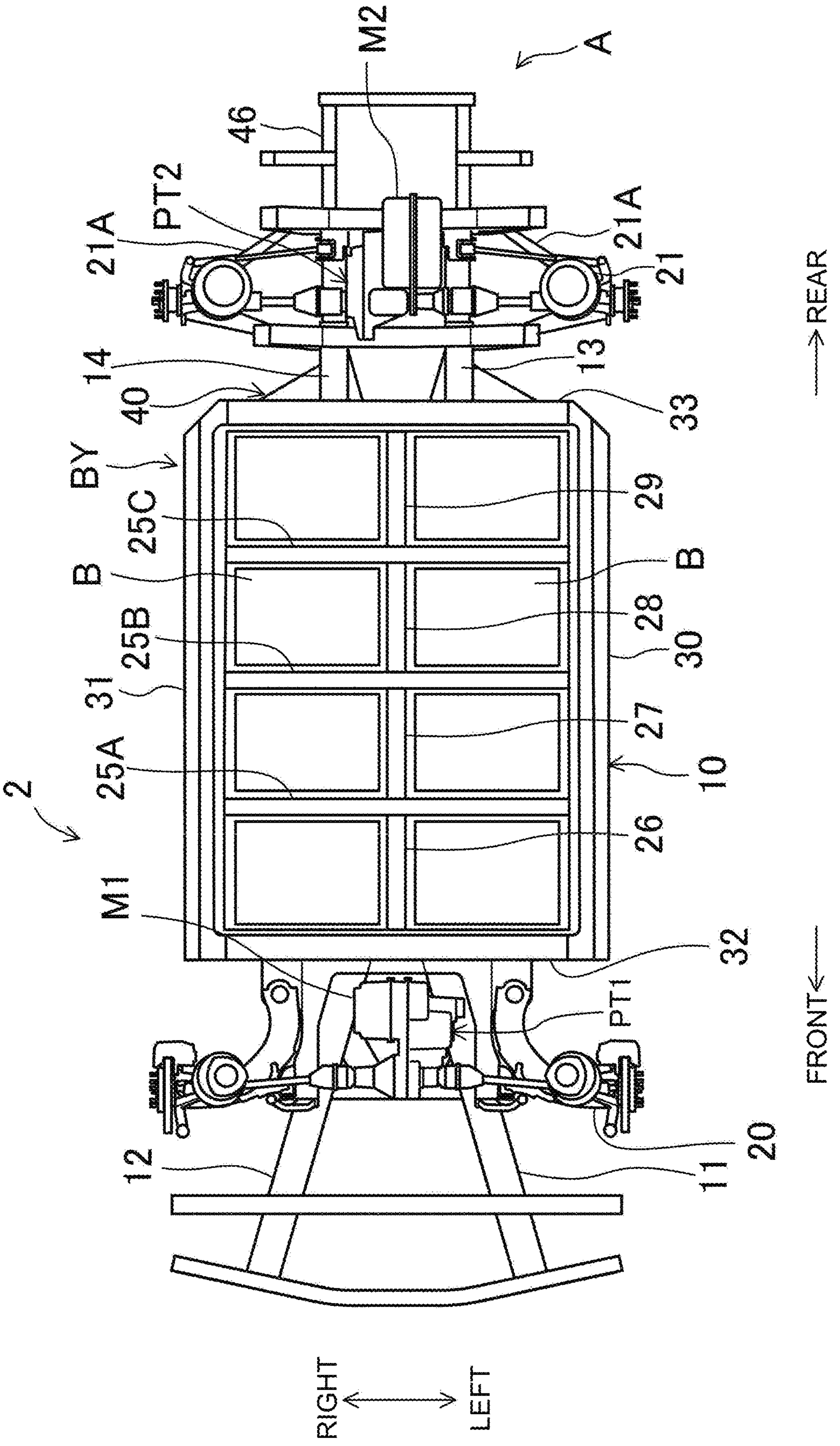
FIG. 3 is a plan view of the lower structure.

Meanwhile, a space (front-side space) in front of the vehicle cabin R1 as a front portion of the electric vehicle 1 can be set as a power chamber R3, for example. That is, as illustrated in FIG. 3, the rear vehicle-body structure A is provided to the electric vehicle 1 which includes a front-side traveling motor M1 installed in a vehicle front portion, a rear-side traveling motor M2 installed in a vehicle rear portion, batteries B supplying electric power to the traveling motors M1 and M2, and a battery casing 10 housing the batteries B. The battery casing 10 is disposed below a floor panel 70 described later and is fixed to left and right side sills 74 and 75.

The front-side traveling motor M1 produces a driving force for driving left and right front wheels FT, and a front-side power train PT1 is configured with only the front-side traveling motor M1 or with the front-side traveling motor M1, a speed reducer, a transmission, and so forth. Further, the rear-side traveling motor M2 illustrated in FIG. 2 and FIG. 3 produces a driving force for driving left and right rear wheels RT (illustrated in FIG. 1), and a rear-side power train PT2 is configured with only the rear-side traveling motor M2 or with the rear-side traveling motor M2, a speed reducer, a transmission, and so forth.

In the present embodiment, the rear-side traveling motor M2 is configured to produce a highest output (maximum torque) which is high compared to the front-side traveling motor M1, and the rear-side traveling motor M2 has a larger size than the front-side traveling motor M1. Accompanying that, the rear-side power train PT2 becomes larger than the front-side power train PT1. Note that the rear-side traveling motor M2 may produce a highest output which is low compared to the front-side traveling motor M1, or the rear-side traveling motor M2 and the front-side traveling motor M1 may produce equivalent highest outputs. Further, only the front-side power train PT1 may be provided, or only the rear-side power train PT2 may be provided. Further, for example, in a case of a large-sized vehicle, the front-side traveling motor M1 and the rear-side traveling motor M2 are installed which are large compared to a small-sized vehicle.

As illustrated in FIG. 2, the lower structure 2 includes the battery casing 10, a pair of left and right front side frames 11 and 12 which extend forward in front of the battery casing 10, and a pair of left and right rear frames 13 and 14 which extend rearward in the rear of the battery casing 10. The left and right rear frames 13 and 14 extend in a front-rear direction in the vehicle rear portion. A reference numeral 11 denotes the left front side frame, and a reference numeral 12 denotes the right front side frame. Further, a reference numeral 13 denotes the left rear frame, and a reference numeral 14 denotes the right rear frame. In FIG. 2, a lid body 35 (described later) of the battery casing 10 is detached.

In a case of a common electric automobile, a battery casing is often formed as a separate body from a vehicle body and is often detachable from a portion below a floor; however, in the present embodiment, not only the battery casing 10, by integrating the left and right front side frames 11 and 12 and the left and right rear frames 13 and 14 with the battery casing 10, but also the front side frames 11 and 12 and the rear frames 13 and 14, together with the battery casing 10, are detachable from the upper structure 3.

Specifically, the electric vehicle 1 of the present embodiment is configured to be capable of being divided, in an up-down direction, into the lower structure 2 having the battery casing 10 and the upper structure 3 forming the vehicle cabin R1 and the trunk R2. Being capable of being divided in the up-down direction means that without using welding, adhesion, or the like, the lower structure 2 is integrated with the upper structure 3 by using fastening members such as bolts, nuts, and screws. Accordingly, because the lower structure 2 can be separated from the upper structure 3 in accordance with necessity when maintenance or repairs are performed after the electric vehicle 1 is passed into the hands of a user, high maintainability is achieved. Note that fastening members used in the following description include bolts, nuts, screws, and so forth.

Here, as a vehicle-body structure of an automobile, a vehicle-body structure of a ladder frame type has been known. In a case of the vehicle-body structure of the ladder frame type, the vehicle-body structure is being capable of being divided, in the up-down direction, into a ladder frame and a cabin, but the ladder frame continuously extends in the front-rear direction and thus mainly receives a collision load in a front collision and a rear collision. In a side collision, the ladder frame only subsidiarily receives a collision load, and the collision load is mainly received by the cabin. As described above, in the vehicle-body structure of the ladder frame type, usually, different members receive collision loads between the front collision and rear collision and the side collision.

On the other hand, in a case of the electric vehicle 1 of the present embodiment, the lower structure 2 having the front side frames 11 and 12 and the rear frame 13 and 14 and the upper structure 3 are capable of being divided; however, a technical idea of the present embodiment is largely different from the vehicle-body structure of the ladder frame type in related art in the point that in both cases of the front collision and rear collision and the side collision, a collision load is received by the lower structure 2 and the upper structure 3, and the collision load is capable of being dispersedly absorbed by both of the structures 2 and 3. In the following, structures of the lower structure 2 and the upper structure 3 will be described in detail.

(Lower Structure)

First, the lower structure 2 will be described. The lower structure 2 includes the front and rear power trains PT1 and PT2, the front wheels FT, the rear wheels RT, a front suspension apparatus 20, a rear suspension apparatus 21, and so forth in addition to the battery casing 10, the front side frames 11 and 12, and the rear frames 13 and 14. Forms of the front suspension apparatus 20 and the rear suspension apparatus 21 are not particularly specified.

A battery unit BY is configured with the battery casing 10 and the batteries B housed in an internal portion of the battery casing 10, but in addition to those, for example, a battery cooling device and so forth may be included in the battery unit BY.

The battery casing 10 is a large casing which is formed, below the floor panel 70 of the upper structure 3, to be spanned from a left end portion vicinity to a right end portion vicinity of the floor panel 70 and to be spanned from a front end portion vicinity to a rear end portion vicinity of the floor panel 70. As described above, the battery casing 10 is disposed in a wide range of a lower region of the floor panel 70, and it thereby becomes possible to install the battery B with a large capacity in the electric vehicle 1. The battery B may be a lithium-ion battery, a solid-state battery, or the like or may be another secondary cell. Further, the battery B may be a so-called battery cell or may be a battery pack housing plural battery cells. In the present embodiment, the battery B is configured with a battery pack, and plural battery packs are installed in a state where those are aligned in the front-rear direction and the left-right direction.

The battery casing 10 includes a left-side battery frame 30, a right-side battery frame 31, a front-side battery frame 32, a rear-side battery frame 33, a bottom plate 34, and the lid body 35 (illustrated in FIG. 5) which covers the batteries B from above. Note that FIG. 2 and FIG. 3 illustrate a state where the lid body 35 is detached.

The left-side battery frame 30, the right-side battery frame 31, the front-side battery frame 32, and the rear-side battery frame 33 are configured with an extruded material or the like of an aluminum alloy, for example, but may be configured with an aluminum alloy plate material or a press-formed material of a steel plate as well. The bottom plate 34 can also be configured with an extruded material. In the following description, “extruded material” denotes an extruded material of an aluminum alloy, and “press-formed material” denotes an aluminum alloy plate material or a press-formed material of a steel plate. Further, each member may be configured with a casting, for example.

All of cross-sectional shapes of the left-side battery frame 30, the right-side battery frame 31, the front-side battery frame 32, and the rear-side battery frame 33 in respective orthogonal directions to their longitudinal directions are rectangular shapes. Further, the left-side battery frame 30, the right-side battery frame 31, the front-side battery frame 32, and the rear-side battery frame 33 are all arranged at the same height and extend in generally horizontal directions.

The left-side battery frame 30 and the right-side battery frame 31 are outer-side battery frames which extend in the front-rear direction on vehicle-width-direction outer sides of the batteries B. The left-side battery frame 30 is provided to a left-side portion of the battery casing 10 and extends in the front-rear direction along a left side sill 74. The left-side battery frame 30 is mounted on the left side sill 74 by fastening members or the like. The right-side battery frame 31 is provided to a right-side portion of the battery casing 10 and extends in the front-rear direction along a right side sill 75. The right-side battery frame 31 is mounted on the right side sill 75 by fastening members or the like.

Further, the front-side battery frame 32 is provided to a front portion of the battery casing 10 and extends in the left-right direction. Further, the rear-side battery frame 33 is a member which extends in the left-right direction in a rear portion of the battery casing 10, that is, in the rear of the batteries B and protects the batteries B. Thus, the rear-side battery frame 33 is configured with a highly strong member.

A left end portion of the front-side battery frame 32 is connected with a front end portion of the left-side battery frame 30, and a right end portion of the front-side battery frame 32 is connected with a front end portion of the right-side battery frame 31. A left end portion of the rear-side battery frame 33 is connected with a rear end portion of the left-side battery frame 30, and a right end portion of the rear-side battery frame 33 is connected with a rear end portion of the right-side battery frame 31. Consequently, the left-side battery frame 30, the right-side battery frame 31, the front-side battery frame 32, and the rear-side battery frame 33 are members which configure a rack frame formed to surround all of the batteries B in a plan view.

Both of the left and right end portions of the front-side battery frame 32 and both of the left and right end portions of the rear-side battery frame 33 are respectively mounted on the left and right side sills 74 and 75 by fastening members or the like. Further, both of the left and right end portions of the rear-side battery frame 33 are connected with the left-side battery frame 30 and the right-side battery frame 31 and are thus mounted on the left and right side sills 74 and 75 via the left-side battery frame 30 and the right-side battery frame 31. Further, both of the left and right end portions of the rear-side battery frame 33 may directly be mounted on the left and right side sills 74 and 75.

The bottom plate 34 extends generally horizontally and is fixed to lower surfaces of the left-side battery frame 30, the right-side battery frame 31, the front-side battery frame 32, and the rear-side battery frame 33. Further, the lid body 35 is fixed to upper surfaces of the left-side battery frame 30, the right-side battery frame 31, the front-side battery frame 32, and the rear-side battery frame 33. In other words, the lid body 35 is mounted on the battery frames 30 to 33. The rear-side battery frame 33 is protruded to the rear of a rear portion of the lid body 35.

When the lid body 35 is mounted on the battery frames 30 to 33, for example, fastening members may be used, or adhesion, welding, or the like may be used. Consequently, a battery housing space S housing the batteries B (illustrated in FIG. 2) is marked off and formed with the left-side battery frame 30, the right-side battery frame 31, the front-side battery frame 32, the rear-side battery frame 33, the bottom plate 34, and the lid body 35.

The size of the battery housing space S can be changed in accordance with the capacity of the installed batteries B. The size of the battery housing space S is capable of being easily changed by changing lengths of the left-side battery frame 30, the right-side battery frame 31, the front-side battery frame 32, and the rear-side battery frame 33 and a shape of the bottom plate 34. For example, in a case where the electric vehicle 1 is a small vehicle which has a short wheelbase and narrow treads, the left-side battery frame 30, the right-side battery frame 31, the front-side battery frame 32, and the rear-side battery frame 33 are made short, the shapes of the bottom plate 34 and the lid body 35 are made small in response to the shortening, and the battery housing space S thereby becomes small in accordance with the small vehicle. On the other hand, in a case of a large vehicle, the left-side battery frame 30, the right-side battery frame 31, the front-side battery frame 32, and the rear-side battery frame 33 are made long, the shapes of the bottom plate 34 and the lid body 35 are made large in response to the elongation, and the battery housing space S thereby becomes large in accordance with the large vehicle. In a case where the left-side battery frame 30, the right-side battery frame 31, the front-side battery frame 32, and the rear-side battery frame 33 are configured with the extruded material, the lengths can easily be changed. Further, the bottom plate 34 can also be configured with the extruded material, and its shape can thereby easily be changed.

An upper portion of the battery housing space S may be closed by the above lid body 35 or may be closed by the floor panel 70 of the upper structure 3. In the battery housing space S, other than the batteries B, a cooling device cooling the batteries B, a heating device heating the batteries B, and so forth (temperature adjustment devices) can also be provided. Further, electric power of the batteries B is supplied to the traveling motors M1 and M2 via a control device. In addition, it is possible to charge the batteries B via a charging socket, a contactless charger, or the like.

As illustrated in FIG. 2, in the internal portion of the battery casing 10 configuring the battery unit BY, as strength members extending in the left-right direction, first to third inside-casing members (inside-unit members) 25A, 25B, and 25C are provided. All of heights of the first to third inside-casing members 25A, 25B, and 25C are the same and are generally the same as the heights of the left-side battery frame 30 and so forth. The inside-casing members 25A, 25B, and 25C may be configured with the extruded material or may be configured with the press-formed material. In the present embodiment, three inside-casing members 25A, 25B, and 25C are provided, but the number of inside-casing members 25A, 25B, and 25C may be increased or decreased in accordance with the dimension of the battery casing 10 in the front-rear direction. The first to third inside-casing members 25A, 25B, and 25C are second members.

The first to third inside-casing members 25A, 25B, and 25C are arranged at distances from each other in the front-rear direction, the first inside-casing member 25A is in a foremost position, and the third inside-casing member 25C is in a rearmost position. A lower portion of each of the inside-casing members 25A, 25B, and 25C is fixed to an upper surface of the bottom plate 34. Further, a left end portion of each of the inside-casing members 25A, 25B, and 25C is fixed to an inner surface (right-side surface) of the left-side battery frame 30, and a right end portion of each of the inside-casing members 25A, 25B, and 25C is fixed to an inner surface (left-side surface) of the right-side battery frame 31. In other words, the inside-casing members 25A, 25B, and 25C are members which connect the left-side battery frame 30 and the right-side battery frame 31 together.

In the internal portion of the battery casing 10, as strength members extending in the front-rear direction, a front central member (inside-unit member) 26 and first to third rear central members (inside-unit members) 27 to 29 are provided. The front central member 26 and the first to third rear central members 27 to 29 are arranged at generally the same heights and are provided at a center of the battery casing 10 in the left-right direction. Lower end portions of the front central member 26 and the first to third rear central members 27 to 29 are mounted on the upper surface of the bottom plate 34. The front central member 26 and the first to third rear central members 27 to 29 are first members. The front central member 26 and first to third rear central members 27 to 29 and the first to third inside-casing members 25A, 25B, and 25C intersect with each other.

The front central member 26 is arranged between the front-side battery frame 32 and the first inside-casing member 25A, a front end portion of the front central member 26 is fixed to a central portion of the front-side battery frame 32 in the left-right direction, and a rear end portion of the front central member 26 is fixed to a central portion of the first inside-casing member 25A in the left-right direction. Consequently, the front-side battery frame 32 is a member which extends so as to connect the front end portions of the left-side battery frame 30 and the right-side battery frame 31 with the front end portion of the front central member 26.

The first rear central member 27 is arranged between the first inside-casing member 25A and the second inside-casing member 25B, a front end portion of the first rear central member 27 is fixed to the central portion of the first inside-casing member 25A in the left-right direction, and a rear end portion of the first rear central member 27 is fixed to a central portion of the second inside-casing member 25B in the left-right direction. Further, the second rear central member 28 is arranged between the second inside-casing member 25B and the third inside-casing member 25C, a front end portion of the second rear central member 28 is fixed to the central portion of the second inside-casing member 25B in the left-right direction, and a rear end portion of the second rear central member 28 is fixed to a central portion of the third inside-casing member 25C in the left-right direction. Further, the third rear central member 29 is arranged between the third inside-casing member 25C and the rear-side battery frame 33, a front end portion of the third rear central member 29 is fixed to the central portion of the third inside-casing member 25C in the left-right direction, and a rear end portion of the third rear central member 29 is fixed to a central portion of the rear-side battery frame 33 in the left-right direction. Consequently, because the first to third inside-casing members 25A, 25B, and 25C and the front central member 26 and first to third rear central members 27 to 29 are disposed in a lattice manner in the internal portion of the battery casing 10 and are coupled with each other, a reinforcement effect for the battery casing 10 is further enhanced.

When an imaginary straight line extending in the front-rear direction is presumed in a plan view, the positions of the front central member 26 and the first to third rear central members 27 to 29 in the left-right direction are set such that the positions are arranged on the imaginary straight line. In other words, the first to third rear central members 27 to 29 are provided to be positioned on a rearward imaginary extension line of the front central member 26. Note that the front central member 26 and the first to third rear central members 27 to 29 may be configured with one member which is continuous in the front-rear direction.

Figure 5:
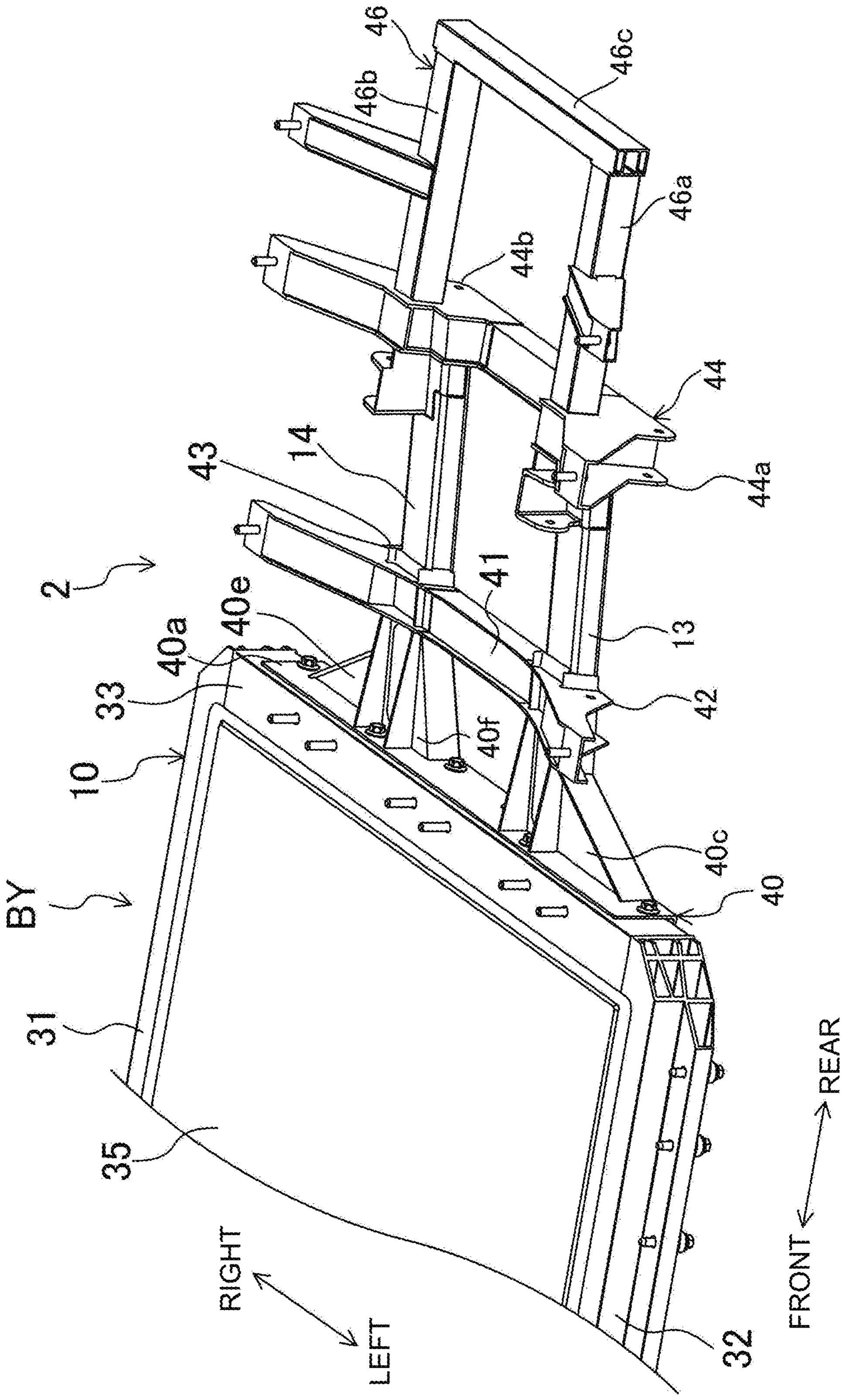
FIG. 5 is a perspective view of a rear-side portion of the lower structure as seen from above.
Figure 6:
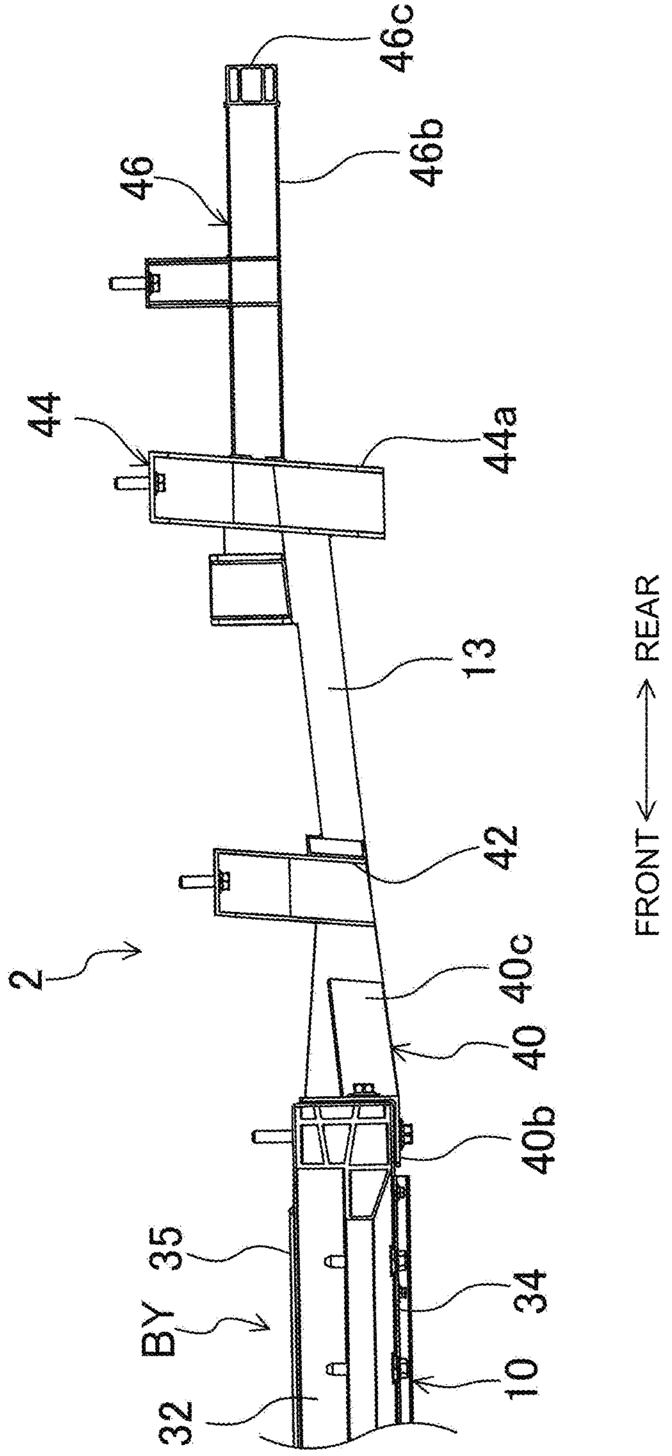
FIG. 6 is a side view of the rear-side portion of the lower structure.

As also illustrated in FIG. 5 and FIG. 6. the lower structure 2 includes the rear-side battery frame 33, the left and right rear frames 13 and 14, and a frame bracket 40, and those members configure a part of the rear vehicle-body structure A. The rear frames 13 and 14 can be configured with the extruded material, the press-formed material, or the like, for example. In the present embodiment, because the rear frames 13 and 14 are configured with the extruded material, their cross-sectional shapes in a direction orthogonal to the front-rear direction are generally equivalent from front end portions to rear end portions.

The left and right rear frames 13 and 14 are mounted on the rear-side battery frame 33 configuring the rear portion of the battery casing 10 via the frame bracket 40. In other words, front portions of the left and right rear frames 13 and 14 are coupled with the rear-side battery frame 33 by the frame bracket 40. The frame bracket 40 is formed with a member which is integrally shaped by using metal and extends in the left-right direction along the rear-side battery frame 33. The front portions of the left and right rear frames 13 and 14 are fixed to the frame bracket 40 by using welding, adhesion, fastening members, or the like. Metal which configures the frame bracket 40 is not particularly limited. For example, aluminum and so forth can be raised, and in this case, the frame bracket 40 can be formed by aluminum die-casting.

The left and right rear frames 13 and 14 are mounted on the rear-side battery frame 33 via the frame bracket 40, but the front portions of the rear frames 13 and 14 can be caused to adjoin a rear surface of the rear-side battery frame 33. Consequently, the rear frames 13 and 14 extend rearward from the rear-side battery frame 33. Note that the front portions of the rear frames 13 and 14 may slightly be spaced apart rearward from the rear surface of the rear-side battery frame 33. In this case also, viewing those as the whole, it can be considered that the rear frames 13 and 14 extend rearward from the rear-side battery frame 33.

The front portion of the left rear frame 13 is arranged to correspond to a section on a left side of a center of the rear-side battery frame 33 in the left-right direction. Further, the front portion of the right rear frame 14 is arranged to correspond to a section on a right side of the center of the rear-side battery frame 33 in the left-right direction. Accordingly, a distance between the left and right rear frames 13 and 14 becomes a predetermined distance. The distance between the rear frames 13 and 14 is set narrower than a distance between the left-side battery frame 30 and the right-side battery frame 31 of the battery casing 10. Further, heights of the left and right rear frames 13 and 14 are generally the same.

As illustrated in FIG. 6, the frame bracket 40 includes a vertical plate portion 40*a* which extends in the vehicle width direction and an up-down direction along the rear surface of the rear-side battery frame 33 and a lower plate portion 40*b* which extends forward from a lower edge portion of the vertical plate portion 40*a* along the lower surface of the rear-side battery frame 33 and which extends also in the vehicle width direction. The vertical plate portion 40*a* and the lower plate portion 40*b* are fixed to the rear-side battery frame 33 by plural fastening members or the like which will be described later. In such a manner, the vertical plate portion 40*a* and the lower plate portion 40*b* of the frame bracket 40 are respectively fixed to the rear surface and the lower surface of the rear-side battery frame 33, and mounting rigidity of the frame bracket 40 with respect to the rear-side battery frame 33 can thereby be enhanced.

Figure 4:
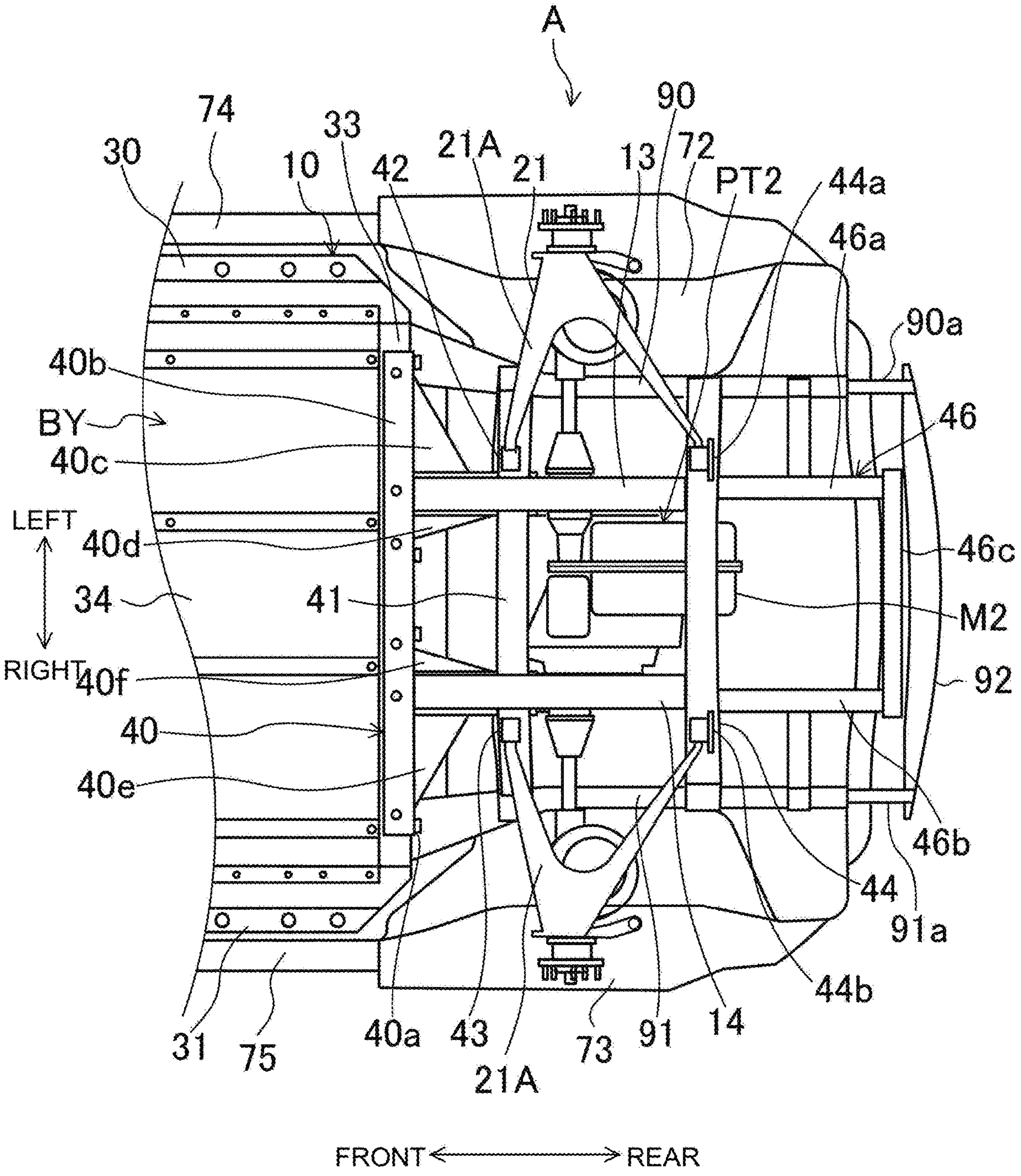
FIG. 4 is a bottom view of a rear vehicle-body structure.

As illustrated in FIG. 4 and FIG. 5, the frame bracket 40 includes a left outside rib 40*c* which is positioned in a left side area of the left rear frame 13, a left inside rib 40*d* which is positioned in a right side area of the left rear frame 13, a right outside rib 40*e* which is positioned in a right side area of the right rear frame 14, and a right inside rib 40*f* which is positioned in a left side area of the right rear frame 14. The left outside rib 40*c* and the left inside rib 40*d* inhibit collapse of the left rear frame 13 in the left-right direction, and the right outside rib 40*e* and the right inside rib 40*f* inhibit collapse of the right rear frame 14 in the left-right direction. In addition, because the ribs 40*c*, 40*d*, 40*e*, and 40*f* are arranged to jut out in the left-right direction of the left and right rear frames 13 and 14, for example, in a case where an impact load from the rear is exerted on the rear frames 13 and 14, the impact load can be dispersed to a wide range in the left-right direction by using the ribs 40*c*, 40*d*, 40*e*, and 40*f*.

The frame bracket 40 is provided with a connecting portion 41 which couples rear end portions of the left outside rib 40*c* and the left inside rib 40*d* with rear end portions of the right outside rib 40*e* and the right inside rib 40*f*. The connecting portion 41 extends in the left-right direction, and the connecting portion 41 couples intermediate portions of the left and right rear frames 13 and 14 in the front-rear direction with each other. In other words, in a plan view, a rectangular closed cross-section is configured with the left and right rear frames 13 and 14, the rear-side battery frame 33, and the connecting portion 41.

On the left side and right side as the vehicle-width-direction outer sides of the frame bracket 40, a pair of left and right arm connecting portions 42 and 43 are respectively provided, with which front portions of left and right suspension arms 21A configuring a part of the rear suspension apparatus 21 are coupled to be rotatable in the up-down direction. The arm connecting portions 42 and 43 extend to a portion above the connecting portion 41, and upper portions of the arm connecting portions 42 and 43 are each mounted on the upper structure 3 to be detachable.

In rear portions of the left and right rear frames 13 and 14, a rear suspension cross member 44 is provided which extends in the left-right direction. The rear portions of the left and right rear frames 13 and 14 are coupled with each other by the rear suspension cross member 44. On the left side and right side as the vehicle-width-direction outer sides of the rear suspension cross member 44, a pair of left and right arm connecting portions 44*a* and 44*b* are respectively provided with which rear portions of the left and right suspension arms 21A are coupled to be rotatable in the up-down direction. The arm connecting portions 44*a* and 44*b* extend upward, and upper portions of the arm connecting portions 44*a* and 44*b* are each mounted on the upper structure 3 to be detachable. Further, in a plan view, a rectangular closed cross-section is configured with the left and right rear frames 13 and 14, the connecting portion 41, and the rear suspension cross member 44.

A subframe 46 is provided in a rear portion of the lower structure 2. The subframe 46 includes a left member 46*a* which is arranged in the rear of the left rear frame 13 and extends in the front-rear direction, a right member 46*b* which is arranged in the rear of the right rear frame 14 and extends in the front-rear direction, and a rear member 46*c* which couples rear end portions of the left member 46*a* and the right member 46*b* with each other.

Front portions of the left member 46*a* and the right member 46*b* of the subframe 46 are fixed to the rear suspension cross member 44. In other words, the subframe 46 is coupled with the left and right rear frames 13 and 14 via the rear suspension cross member 44. As illustrated in FIG. 6, in a connected state, the left and right rear frames 13 and 14 are positioned below the subframe 46.

(Upper Structure)

Next, the upper structure 3 will be described. As illustrated in FIG. 2, the upper structure 3 includes the floor panel 70, a dash panel (partition wall portion) 71, and the pair of left and right side sills 74 and 75. A reference numeral 74 denotes the left side sill, and a reference numeral 75 denotes the right side sill.

The floor panel 70 configures a floor surface of the vehicle cabin R1 and is formed with a steel plate or the like which extends in the front-rear direction and extends also in the left-right direction. A space above the floor panel 70 serves as the vehicle cabin R1. A roof 80 is provided to an upper portion of the vehicle cabin R1. Further, in both of left and right side portions of the upper structure 3, front openings 3*a* and rear openings 3*b* are respectively formed. As illustrated in FIG. 1, the front opening 3*a* and the rear opening 3*b* are capable of being opened and closed by a front door 81 and a rear door 82, respectively. Note that a front door and a rear door are disposed on a right side of the upper structure 3 to be capable of being opened and closed.

The left and right side sills 74 and 75 are respectively disposed in both of left and right end portions of the floor panel 70 to extend in the front-rear direction. The left end portion of the floor panel 70 is connected with an intermediate portion of the left side sill 74 in the up-down direction, and the right end portion of the floor panel 70 is connected with an intermediate portion of the right side sill 75 in the up-down direction. Upper-side portions of the side sills 74 and 75 are protruded upward from connected sections with the floor panel 70, and lower-side portions of the side sills 74 and 75 are protruded downward from the connected sections with the floor panel 70. Because the battery casing 10 is arranged below the floor panel 70, the battery casing 10 is arranged between the left and right side sills 74 and 75, and in a vehicle side view, the lower-side portions of the side sills 74 and 75 overlap with the battery casing 10.

The dash panel 71 is a member which extends in the vehicle width direction and the up-down direction and is for partitioning the vehicle cabin R1 from the power chamber R3. A lower end portion of the dash panel 71 is connected with the front end portion of the floor panel 70.

Figure 7:
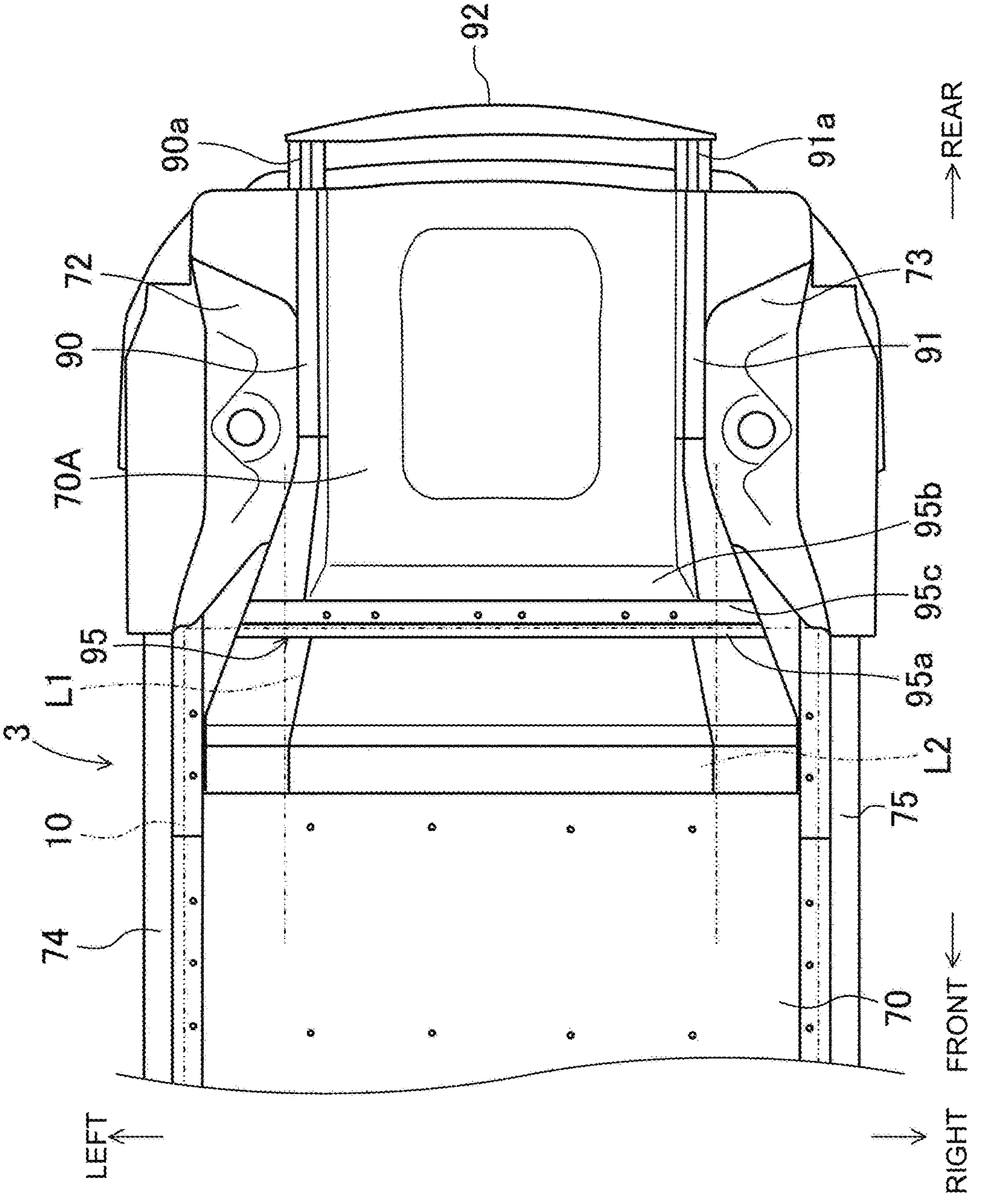
FIG. 7 is a bottom view of a rear-side portion of the upper structure.

FIG. 7 is a bottom view of a rear-side portion of the upper structure 3, and as illustrated in FIG. 7, the floor panel 70 of the upper structure 3 has a rear panel portion 70A which configures a floor surface of the trunk R2. On both of left and right sides of the rear panel portion 70A, left and right rear wheel wells 72 and 73 are respectively provided.

The upper structure 3 includes a pair of left and right rear side frames 90 and 91 which extend in the front-rear direction in the vehicle rear portion. The left rear side frame 90 is formed to extend along a left end portion of the rear panel portion 70A on the vehicle-width-direction inner side of the left rear wheel well 72. In a rear portion of the left rear side frame 90, a left crush can 90*a* is provided to be protruded to the rear of a rear portion of the rear panel portion 70A.

The right rear side frame 91 is formed to extend along a right end portion of the rear panel portion 70A on the vehicle-width-direction inner side of the right rear wheel well 73. In a rear portion of the right rear side frame 91, a right crush can 91*a* is provided to be protruded to the rear of the rear portion of the rear panel portion 70A. A bumper reinforcement 92 which extends in the left-right direction is mounted on the rear portion of the left crush can 90*a* and the rear portion of the right crush can 91*a*. Front-side portions of the left and right rear side frames 90 and 91 are formed to be bent or inclined downward.

Figure 8:
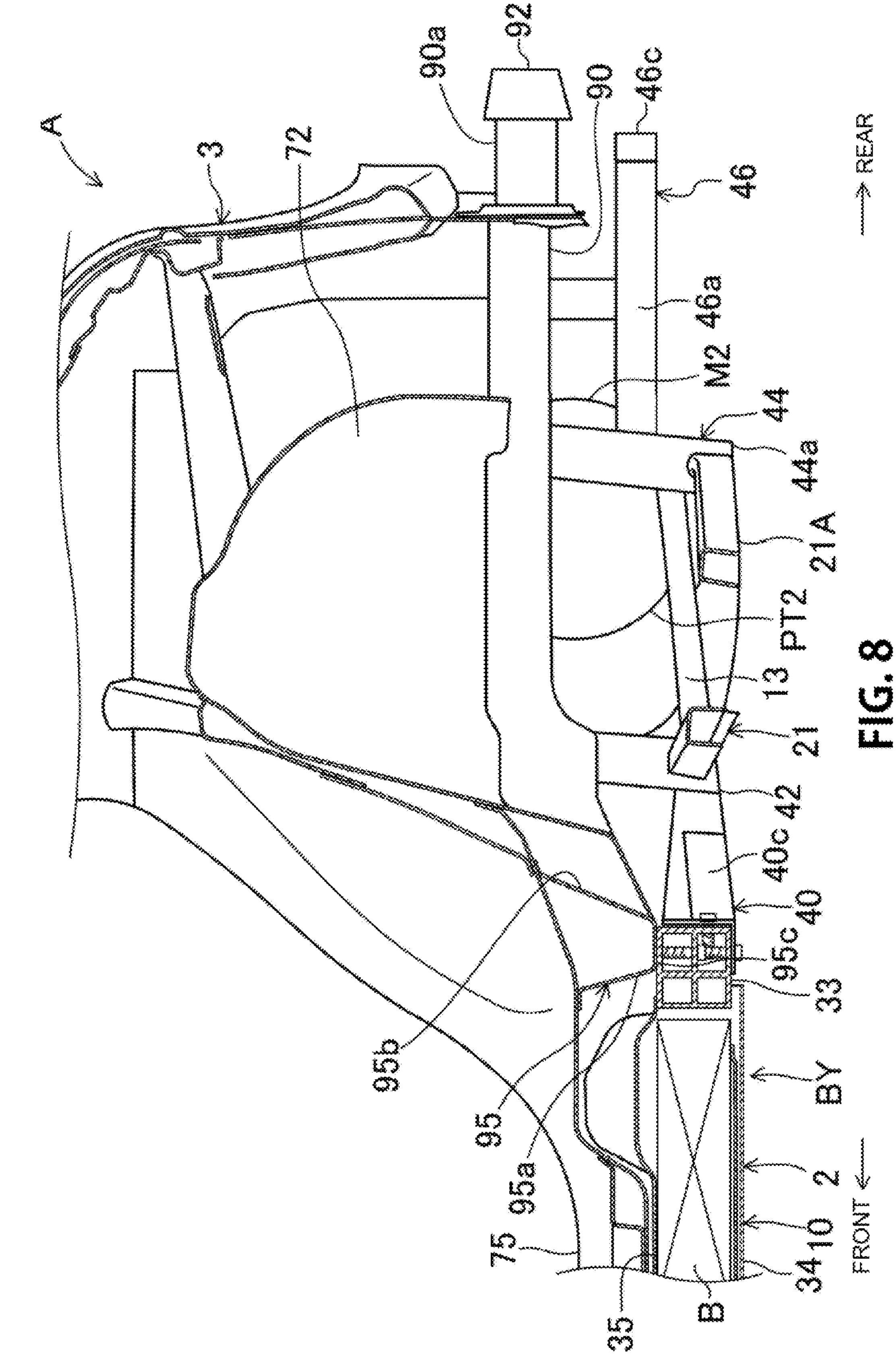
FIG. 8 is a cross-sectional view in which a left-side portion of the rear vehicle-body structure is sectioned in a vertical direction.

Further, as illustrated in FIG. 4 and FIG. 8, the rear-side battery frame 33 of the battery casing 10 extends in the vehicle width direction in front of front portions of the rear side frames 90 and 91. More specifically, because the battery casing 10 is provided below the floor panel 70, the rear-side battery frame 33 is arranged below the front portions of the rear side frames 90 and 91.

The front portion of the left rear side frame 90 is spaced apart, by a prescribed distance, from a rear portion of the left side sill 74 to the rear and to the vehicle-width-direction inner side, and the front portion of the left rear side frame 90 is not connected with the rear portion of the left side sill 74. Further, similarly, the front portion of the right rear side frame 91 is spaced apart, by a prescribed distance, from a rear portion of the right side sill 75 to the rear and to the vehicle-width-direction inner side, and the front portion of the right rear side frame 91 is not connected with the rear portion of the right side sill 75. That is, hypothetically, when a case is presumed where the left rear side frame 90 is connected with the left side sill 74, the front portion of the rear side frame 90 is elongated forward and is thereby connected with the rear portion of the side sill 74. In such a case, the front portion of the rear side frame 90 is protruded to the vehicle-width-direction inner side of the rear wheel well 72. The same applies to the right side, and the front portion of the rear side frame 91 is protruded to the vehicle-width-direction inner side of the rear wheel well 73. When the left and right rear side frames 90 and 91 are protruded to the vehicle-width-direction inner sides, a dimension, in the left-right direction, of a rear side of the battery casing 10 has to be shortened, and further an installed amount of the batteries B is decreased.

In the present embodiment, by not connecting the rear side frames 90 and 91 respectively with the side sills 74 and 75, a space is formed in which the battery casing 10 is capable of being elongated rearward. Accordingly, because the battery casing 10 can be elongated rearward such that the rear side of the battery casing 10 becomes close to the rear wheel wells 72 and 73 and a long dimension, in the left-right direction, of the rear side of the battery casing 10 can be secured, the installed amount of the batteries B can be increased.

For example, as illustrated in FIG. 7, in a case where an imaginary straight line L1 is presumed which extends forward from a central portion, in the left-right direction, of the front portion of the left rear side frame 90 and an imaginary straight line L2 is presumed which extends forward from a central portion, in the left-right direction, of the front portion of the right rear side frame 91, the battery casing 10 (its external shape is indicated by imaginary lines) is provided from a region on the left side of the imaginary straight line L1 to a region on the right side of the imaginary straight line L2. Such a large battery casing 10 is formed, the batteries B are thereby installed through an area between vehicle-width-direction outer sides of the imaginary straight lines L1 and L2, and the installed amount of the batteries B can further be increased.

Further, in a vehicle side view, the battery casing 10 extends to the rear of the rear portions of the side sills 74 and 75. Thus, because the rear-side battery frame 33 is positioned in the rear of the rear portions of the side sills 74 and 75, the batteries B are capable of being installed to the rear of the rear portions of the side sills 74 and 75.

In addition, in a case of not connecting the rear side frames 90 and 91 respectively with the side sills 74 and 75 and where an impact load is exerted from the rear, a problem possibly occurs that there is no direct load transmission path from the rear side frames 90 and 91 to the side sills 74 and 75; however, in the present embodiment, even when no such load transmission path is present, the impact load from the rear is capable of being absorbed by using the battery casing 10.

Figure 9:
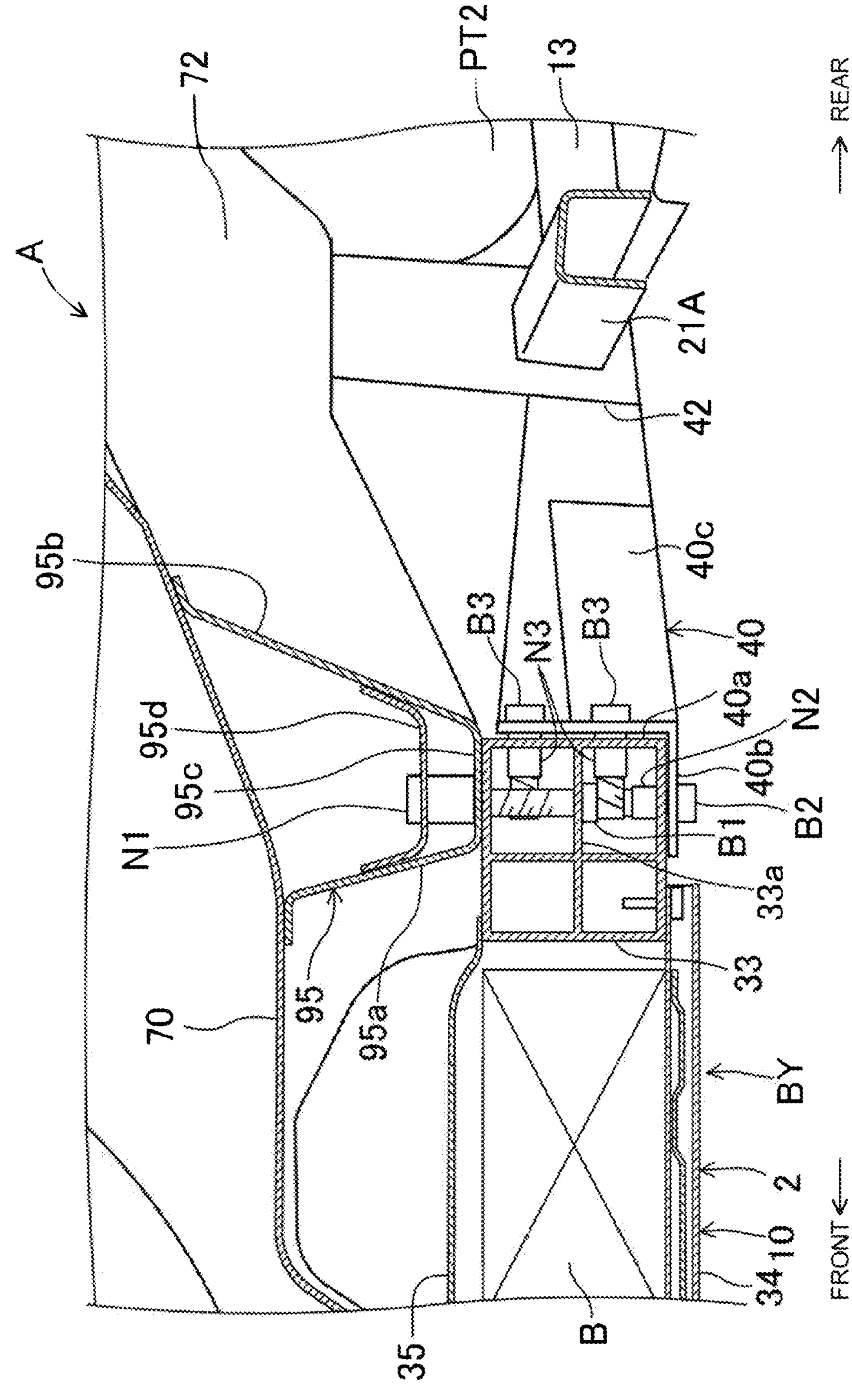
FIG. 9 is an enlarged cross-sectional view in which the left-side portion of the rear vehicle-body structure is sectioned in the vertical direction.
Figure 10:
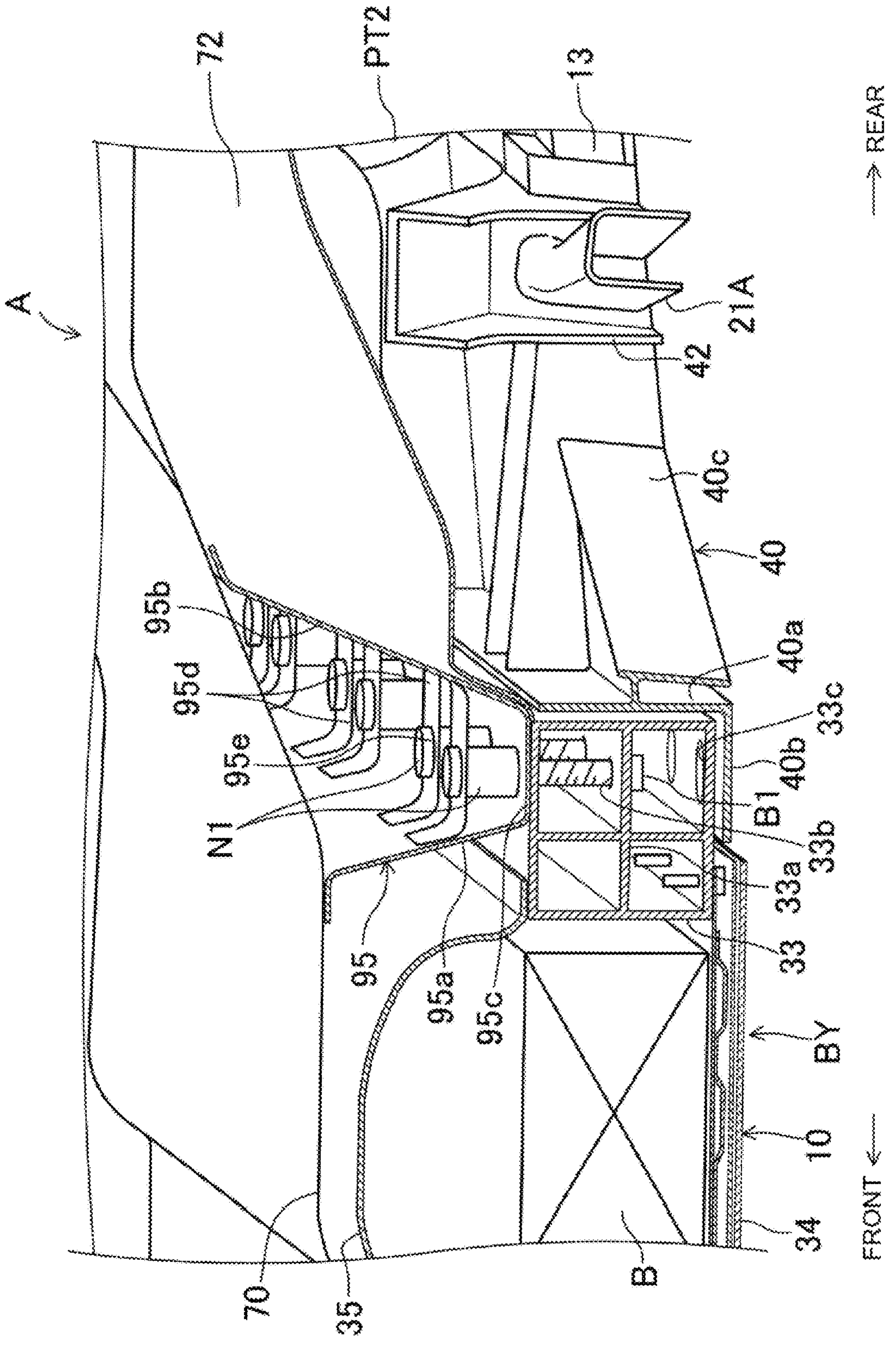
FIG. 10 is a perspective cross-sectional view in which the left-side portion of the rear vehicle-body structure is sectioned in the vertical direction.

That is, as illustrated in FIG. 8 to FIG. 10, the left and right rear side frames 90 and 91 are coupled with the rear-side battery frame 33 by the frame bracket 40. Specifically, the upper structure 3 includes a rear-side cross member 95, and the rear-side cross member 95 is arranged such that the front portions of the rear side frames 90 and 91 abut the rear-side cross member 95 from the rear and extends in the vehicle width direction. The rear-side cross member 95 includes a front plate portion 95*a* which is continuous from the vicinity of a front portion of the left wheel well 72 to the vicinity of a front portion of the right wheel well 73 and extends in the up-down direction and the left-right direction, a rear plate portion 95*b* which is arranged to be spaced apart rearward from the front plate portion 95*a* and extends in the up-down direction and the left-right direction, and a lower plate portion 95*c* which extends from a lower end portion of the front plate portion 95*a* to a lower end portion of the rear plate portion 95*b*. A dimension of the rear plate portion 95*b* in the up-down direction is set longer than a dimension of the front plate portion 95*a* in the up-down direction, and an upper end portion of the rear plate portion 95*b* is positioned above an upper end portion of the front plate portion 95*a*. Further, inclination angles of the front plate portion 95*a* and the rear plate portion 95*b* are set such that a distance between the front plate portion 95*a* and the rear plate portion 95*b* in the front-rear direction becomes wider toward a higher position.

The upper end portion of the front plate portion 95*a* and the upper end portion of the rear plate portion 95*b* are joined to a lower surface of the floor panel 70, and a closed cross-section is formed with the front plate portion 95*a*, the rear plate portion 95*b*, the lower plate portion 95*c*, and the floor panel 70. Accordingly, rigidity of the floor panel 70 can be enhanced.

The front portions of the rear side frames 90 and 91 abut the rear plate portion 95*b* of the rear-side cross member 95 from the rear and are joined to the rear plate portion 95*b* and the lower plate portion 95*c*. Because a dimension of the rear plate portion 95*b* in the up-down direction is long compared to the front plate portion 95*a*, a wide joining area of the rear side frames 90 and 91 with respect to the rear-side cross member 95 can be secured.

As illustrated in FIG. 8, the rear-side cross member 95 is formed to be arranged on the upper surface of the rear-side battery frame 33 and to extend along the upper surface of the rear-side battery frame 33. The rear-side cross member 95 and the rear-side battery frame 33 are fastened together in the up-down direction. Accordingly, the rear-side battery frame 33 is set to a state where that is mounted on the rear-side cross member 95 to be detachable.

Specifically, as illustrated in FIG. 9, a lower surface of a cylindrical nut N1 which extends in the up-down direction is fixed to an upper surface of the lower plate portion 95*c* of the rear-side cross member 95. Because the nut N1 is disposed in the rear-side cross member 95, an inner space of the rear-side cross member 95 can efficiently be used.

As illustrated in FIG. 10, plural nuts N1 are provided at distances from each other in the left-right direction. Plural reinforcement plates 95*d* corresponding to the number of nuts N1 are provided in an internal portion of the rear-side cross member 95. The reinforcement plate 95*d* has a through hole 95*e* through which an upper portion of the nut N1 passes. Because an outer peripheral surface of the nut N1 is welded to a peripheral edge portion of the through hole 95*e* in a state where the upper portion of the nut N1 passes through the through hole 95*e*, fixing strength of the nut N1 can be enhanced. A front-side portion of the reinforcement plate 95*d* is formed along an inner surface of the front plate portion 95*a* and is welded to the front plate portion 95*a*. A rear-side portion of the reinforcement plate 95*d* is formed along an inner surface of the rear plate portion 95*b* and is welded to the rear plate portion 95*b*. Consequently, a state is established where the front plate portion 95*a* and the rear plate portion 95*b* are coupled together by the reinforcement plate 95*d*.

An intermediate wall portion 33*a* which extends in the front-rear direction and the left-right direction is integrally shaped in an internal portion of the rear-side battery frame 33. In the intermediate wall portion 33*a*, an insertion hole 33*b* is formed through which a bolt B1 is inserted from below. The same number of insertion holes 33*b* as the number of nuts N1 are provided and formed at the same distances as the distances among the nuts N1. The nut N1 is arranged directly above the insertion hole 33*b*. The bolt B1 inserted through the insertion hole 33*b* passes through the upper wall portion of the rear-side battery frame 33 and is screwed into the nut N1 from below while passing through the lower plate portion 95*c*. The bolts B1 are respectively screwed into the nuts N1, and the rear-side cross member 95 and the rear-side battery frame 33 can thereby be fastened together at plural parts. A reference character 33*c* in FIG. 10 denotes an opening for causing the bolt B1 to pass through the rear-side battery frame 33 from below, and plural openings are formed in a lower wall portion of the rear-side battery frame 33.

(Fastening Structure of Frame Bracket)

Next, a description will be made about a fastening structure of the frame bracket 40 on the rear-side battery frame 33. As illustrated in FIG. 9, to an inner surface (upper surface) of the lower wall portion of the rear-side battery frame 33, plural nuts N2 are fixed at distances from each other in the vehicle width direction. An axis line of the nut N2 extends in the up-down direction and is parallel with an axis line of the nut N1.

The lower plate portion 40*b* of the frame bracket 40 is arranged on an outer surface (lower surface) of the lower wall portion of the rear-side battery frame 33, and plural bolts B2 which are screwed into the nuts N2 pass through, from below, the lower wall portion of the rear-side battery frame 33 and the lower plate portion 40*b* of the frame bracket 40. The bolt B2, which passes through, from below, the lower wall portion of the rear-side battery frame 33 and the lower plate portion 40*b* of the frame bracket 40, is screwed into the nut N2 from below. The bolts B2 are respectively screwed into the nuts N2, and the frame bracket 40 and the rear-side battery frame 33 can thereby be fastened together at plural parts.

Further, plural nuts N3 are fixed to an inner surface (front surface) of a rear wall portion of the rear-side battery frame 33. An axis line of the nut N3 extends in the front-rear direction and is orthogonal to the axis lines of the nut N1 and nut N2 in a side view. The plural nuts N3 are provided at distances from each other in the vehicle width direction and are respectively provided also to an upper-side portion and a lower-side portion of the rear wall portion of the rear-side battery frame 33. The vertical plate portion 40*a* of the frame bracket 40 is arranged on an outer surface (rear surface) of the rear wall portion of the rear-side battery frame 33, and plural bolts B3 which are screwed into the nuts N3 pass through the rear wall portion of the rear-side battery frame 33 and the vertical plate portion 40*a* of the frame bracket 40. The bolt B3, which passes through, from below, the rear wall portion of the rear-side battery frame 33 and the vertical plate portion 40*a* of the frame bracket 40, is screwed into the nut N3 from the rear. The bolts B3 are respectively screwed into the nuts N3, and the frame bracket 40 and the rear-side battery frame 33 can thereby be fastened together at plural parts.

Working Effects of Embodiment

As described above, in the present embodiment, an impact load exerted from vehicle rear is input to the left and right rear side frame 90 and 91 via the bumper reinforcement 92, and the left and right crush cans 90*a* and 91*a* are compressed and deformed. As for a large impact load which cannot be absorbed even by the compression and deformation, because the rear-side battery frame 33 is mounted on the left and right side sills 74 and 75 and on the rear-side cross member 95, an impact load input to the rear side frames 90 and 91 is transmitted to the left and right side sills 74 and 75 and the rear-side battery frame 33 via the rear-side cross member 95. Because the rear-side battery frame 33 is a member for protecting the batteries B and thus has high strength, the input impact load is absorbed by the rear-side battery frame 33. In other words, because it becomes possible to cause the input impact load to be transmitted to and absorbed by the left and right side sills 74 and 75 via the rear-side battery frame 33, the side sills 74 and 75 do not have to be directly connected with the rear side frames 90 and 91. Thus, it becomes possible to increase the installed amount of the batteries B by elongating an installation space of the batteries B to a vehicle rear side.

Further, because the left-side battery frame 30 and the right-side battery frame 31 are connected with the rear-side battery frame 33, an impact load input to the rear-side battery frame 33 can also be dispersed to and absorbed by the left-side battery frame 30 and the right-side battery frame 31.

Note that an impact load from the rear is also input to the subframe 46 of the lower structure 2. Because the impact load input to the subframe 46 is transmitted to the left and right rear frames 13 and 14 via the rear suspension cross member 44, the impact load input to the subframe 46 is also transmitted to and absorbed by the rear-side battery frame 33 via the frame bracket 40.

The above-described embodiment is merely an example in all respects and is not to be construed in a limited manner. Furthermore, all modifications and changes belonging to the equivalent scope of the claims are included in the scope of the present disclosure.

INDUSTRIAL APPLICABILITY

As described in the foregoing, a rear vehicle-body structure according to the present disclosure can be provided to an electric vehicle, for example.

The invention claimed is:

1. A rear vehicle-body structure for an electric vehicle which includes a traveling motor and in which a battery supplying electric power to the traveling motor is disposed below a floor panel, the rear vehicle-body structure comprising:

a rear side frame which extends in a vehicle front-rear direction in a vehicle rear portion;

a rear-side cross member which is arranged such that a front portion of the rear side frame abuts the rear-side cross member from vehicle rear, the rear-side cross member extending in a vehicle width direction;

a pair of left and right side sills which are spaced apart, by predetermined distances, from the front portion of the rear side frame to vehicle-width-direction outer sides and extend in the vehicle front-rear direction; and a rear-side battery frame which extends in the vehicle width direction in the vehicle rear of the battery and in vehicle front of the rear side frame and protects the battery, wherein a battery casing which includes the rear-side battery frame is mounted on the left and right side sills and on the rear-side cross member, wherein the battery is installed in an area on the vehicle-width-direction outer side of an imaginary straight line, the imaginary straight line extending forward from a central portion, in the left-right direction, of the front portion of the rear side frame toward the vehicle front, wherein in a vehicle side view, the battery is installed to an area in the vehicle rear of rear portions of the side sills, wherein the rear-side cross member has a front plate portion and a rear plate portion that form a closed cross-section, and has a lower plate portion extending from a lower end of the front plate portion to a lower end of the rear plate portion such that the closed cross-section protrudes downward, and the rear-side cross member is formed to be arranged on an upper surface of the rear-side battery frame and to extend along the upper surface of the rear-side battery frame, and wherein the rear-side cross member and the rear-side battery frame are fastened together in an up-down direction at the lower plate portion without an intermediate bracket therebetween, and the front portion of the rear side frame is not joined to the side sills.

2. The rear vehicle-body structure according to claim 1, wherein the rear-side cross member is joined to a lower surface of the floor panel.

3. The rear vehicle-body structure according to claim 2, wherein the rear-side cross member has a front plate portion which extends in an up-down direction and the vehicle width direction and a rear plate portion which is spaced apart from the front plate portion in a vehicle longitudinal direction and extends in the up-down direction and the vehicle width direction, and a dimension of the rear plate portion in the up-down direction is set longer than a dimension of the front plate portion in the up-down direction, and the front portion of the rear side frame abuts the rear plate portion from the vehicle rear and is joined to the rear plate portion.

4. The rear vehicle-body structure according to claim 1, wherein in a vehicle side view, the battery is installed to an area in the vehicle rear of rear portions of the side sills.

5. The rear vehicle-body structure according to claim 1, wherein the rear-side cross member is formed to be arranged on an upper surface of the rear-side battery frame and to extend along the upper surface of the rear-side battery frame, and the rear-side cross member and the rear-side battery frame are fastened together in an up-down direction.

6. The rear vehicle-body structure according to claim 5, wherein the rear-side cross member is joined to a lower surface of the floor panel.

7. The rear vehicle-body structure according to claim 1, wherein the rear-side cross member has a front plate portion which extends in an up-down direction and the vehicle width direction and a rear plate portion which is spaced apart from the front plate portion in a vehicle longitudinal direction and extends in the up-down direction and the vehicle width direction, and a dimension of the rear plate portion in the up-down direction is set longer than a dimension of the front plate portion in the up-down direction, and the front portion of the rear side frame abuts the rear plate portion from the vehicle rear and is joined to the rear plate portion.

8. The rear vehicle-body structure according to claim 4, wherein the rear-side cross member is formed to be arranged on an upper surface of the rear-side battery frame and to extend along the upper surface of the rear-side battery frame, and the rear-side cross member and the rear-side battery frame are fastened together in an up-down direction.

9. The rear vehicle-body structure according to claim 4, wherein the rear-side cross member is joined to a lower surface of the floor panel.

10. The rear vehicle-body structure according to claim 4, wherein the rear-side cross member has a front plate portion which extends in an up-down direction and the vehicle width direction and a rear plate portion which is spaced apart from the front plate portion in a vehicle longitudinal direction and extends in the up-down direction and the vehicle width direction, and a dimension of the rear plate portion in the up-down direction is set longer than a dimension of the front plate portion in the up-down direction, and the front portion of the rear side frame abuts the rear plate portion from the vehicle rear and is joined to the rear plate portion.

11. The rear vehicle-body structure according to claim 8, wherein the rear-side cross member is joined to a lower surface of the floor panel.

12. The rear vehicle-body structure according to claim 8, wherein the rear-side cross member has a front plate portion which extends in an up-down direction and the vehicle width direction and a rear plate portion which is spaced apart from the front plate portion in a vehicle longitudinal direction and extends in the up-down direction and the vehicle width direction, and a dimension of the rear plate portion in the up-down direction is set longer than a dimension of the front plate portion in the up-down direction, and the front portion of the rear side frame abuts the rear plate portion from the vehicle rear and is joined to the rear plate portion.

13. The rear vehicle-body structure according to claim 9, wherein the rear-side cross member has a front plate portion which extends in an up-down direction and the vehicle width direction and a rear plate portion which is spaced apart from the front plate portion in a vehicle longitudinal direction and extends in the up-down direction and the vehicle width direction, and a dimension of the rear plate portion in the up-down direction is set longer than a dimension of the front plate portion in the up-down direction, and the front portion of the rear side frame abuts the rear plate portion from the vehicle rear and is joined to the rear plate portion.

* * * * *